United States Patent
Hattori et al.

(10) Patent No.: US 7,480,924 B2
(45) Date of Patent: Jan. 20, 2009

(54) MAGNETIC RECORDING AND REPRODUCING DEVICE AND MAGNETIC RECORDING MEDIUM

(75) Inventors: Kazuhiro Hattori, Tokyo (JP); Yoshikazu Soeno, Tokyo (JP); Mitsuru Takai, Tokyo (JP); Shuichi Okawa, Tokyo (JP)

(73) Assignee: TDK Corporation, Tokyo (JP)

( * ) Notice: Subject to any disclaimer, the term of this patent is extended or adjusted under 35 U.S.C. 154(b) by 332 days.

(21) Appl. No.: 11/056,976

(22) Filed: Feb. 14, 2005

(65) Prior Publication Data

US 2005/0193405 A1 Sep. 1, 2005

(30) Foreign Application Priority Data

Feb. 27, 2004 (JP) .............................. 2004-054742

(51) Int. Cl.
*G11B 7/09* (2006.01)
(52) U.S. Cl. .................................................... 720/659
(58) Field of Classification Search ................ 720/659; 369/275.1, 277, 13.38; 428/141, 332, 694 ML, 428/819, 64.4
See application file for complete search history.

(56) References Cited

U.S. PATENT DOCUMENTS

| | | | | |
|---|---|---|---|---|
| 5,759,657 A | * | 6/1998 | Onagi et al. ............... | 428/64.4 |
| 5,821,004 A | * | 10/1998 | Hino et al. ................. | 428/819 |
| 5,976,667 A | * | 11/1999 | Hiroki ....................... | 428/141 |
| 6,027,825 A | * | 2/2000 | Shiratori et al. ............ | 428/819 |
| 6,265,062 B1 | * | 7/2001 | Shiratori .................... | 428/332 |
| 6,483,784 B1 | * | 11/2002 | Nakatani et al. .......... | 369/13.38 |
| 2002/0132138 A1 | * | 9/2002 | Miyaoka ............. | 428/694 ML |

FOREIGN PATENT DOCUMENTS

| JP | A-07-085406 | 3/1995 |
|---|---|---|
| JP | A 11-224401 | 8/1999 |
| JP | A-2000-195002 | 7/2000 |
| JP | A 2001-250201 | 9/2001 |
| JP | A-2002-074647 | 3/2002 |
| JP | A 2002-288953 | 10/2002 |
| JP | A-2003-157502 | 5/2003 |

* cited by examiner

*Primary Examiner*—Tianjie Chen
(74) *Attorney, Agent, or Firm*—Oliff & Berridge, PLC (57) ABSTRACT

A magnetic recording and reproducing device includes: a magnetic recording medium in which a magnetic recording layer is formed in a concavo-convex pattern so that tracks are formed by convex portions of a predetermined track width and arranged in parallel in the track width direction; a heating head for heating the magnetic recording medium to partially reduce coercivity of the tracks; a recording head for applying a recording magnetic field to a heated portion of the magnetic recording medium to record magnetic data on the tracks; and a reproducing head for detecting a reproducing magnetic field of the tracks. In this configuration, an effective recording area has an effective recording width that is equal to or more than the track width, and equal to or less than a sum of the track width and a doubled value of width of concave portions between the tracks.

6 Claims, 6 Drawing Sheets

Position on magnetic recording medium
in track width direction

MAGNETIC RECORDING AND REPRODUCING DEVICE AND MAGNETIC RECORDING MEDIUM

BACKGROUND OF THE INVENTION

1. Field of the Invention

The present invention relates to a magnetic recording and reproducing device which records magnetic data by application of heat and magnetic field and magnetically reproduces the magnetic data, and to a magnetic recording medium.

2. Description of the Related Art

There has been a remarkable increase in areal density of magnetic recording media such as hard discs by various improvements including reduction in the grain size of magnetic particles forming the magnetic recording layer, material changes, and increased precision in the processing of magnetic heads, and a further improvement in the areal density is expected.

As the increase in the areal density leads to thermal instability, it is preferable to use material that has high magnetic anisotropy, which exhibits high coercivity, for the magnetic recording layer; however, with conventional magnetic heads, it was hard to apply a stronger magnetic field than the coercivity of such a high magnetic anisotropy material, i.e., recording and deleting of magnetic data were hard to achieve.

Meanwhile, there has been known a magnetic recording and reproducing device that projects electron beam to the magnetic recording layer to reduce the coercivity by heat so as to achieve recording and reproducing of magnetic data (see, for example, Japanese Patent Laid-Open Publication No. 2001-250201).

With this method, however, it was hard to precisely magnetize only a target portion of the magnetic recording layer, because the peripheral part of the portion to which electron beam is projected is also heated by heat conduction, and because the temperature distribution of the heated portion and the magnetic field distribution of the magnetic head are not uniform. The data recording and reproducing precision was accordingly low.

The recording and reproducing precision could be improved if the minimum area for recording data were made large enough, but this would reduce the areal density.

SUMMARY OF THE INVENTION

In view of the foregoing problems, various exemplary embodiments of this invention provide a magnetic recording and reproducing device that achieves both a high areal density and good recording and reproducing precision, and a magnetic recording medium.

The present invention provides a magnetic recording medium having a magnetic recording layer formed in a concavo-convex pattern so that tracks are formed by convex portions of a predetermined track width, and an effective recording area created on the magnetic recording medium by a heating head and a recording head has an effective recording width in the track width direction that is equal to or more than the track width and equal to or less than a sum of the track width and a doubled value of width of concave portions between the tracks, so as to ensure that magnetic data is reliably recorded to the edges of a recording target track while preventing erroneous recording of magnetic data onto adjacent tracks.

Accordingly, various exemplary embodiments of the present invention provide a magnetic recording and reproducing device comprising:

a magnetic recording medium in which a magnetic recording layer is formed in a concavo-convex pattern so that a plurality of tracks for recording magnetic data are formed by convex portions of a predetermined track width and arranged in parallel with a predetermined track pitch in a track width direction;

a heating head for heating the magnetic recording medium to partially reduce coercivity of the tracks;

a recording head for applying a recording magnetic field to a heated portion of the magnetic recording medium; and a reproducing head for detecting a reproducing magnetic field of the tracks, wherein an effective recording area created by the heating head and the recording head on the magnetic recording medium has an effective recording width in the track width direction that is equal to or more than the track width, and equal to or less than a sum of the track width and a doubled value of width of concave portions between the tracks.

Furthermore, various exemplary embodiments of the present invention provide a magnetic recording medium comprising a magnetic recording layer formed in a concavo-convex pattern wherein concave portions of the concavo-convex pattern are filled with a non-magnetic material that has a lower heat conductivity than the magnetic recording layer.

The phrase of "magnetic recording layer formed in a concavo-convex pattern" used herein refers not only to a magnetic recording layer that is divided into a number of recording elements, but also to a recording layer that is partially divided so as to have continuous part, a recording layer continuously formed on part of the substrate in a helical (spiral) shape, and a continuous recording layer having both concave and convex portions.

The term "magnetic recording medium" used herein should be understood to include other magnetic recording media such as floppy discs (registered trademark), other than hard discs.

The term "effective recording area" used herein should be understood as an area which is created on the magnetic recording medium by the heating head and the recording head assuming that the magnetic recording layer is entirely evenly formed, the area having a stronger recording magnetic field than the coercivity of the magnetic recording layer so that magnetic data can be recorded and deleted.

The term "recording offtrack" used herein should be understood as an amount of offtrack error in the track width direction between the center of the effective recording area and the center of the recording target track in the track width direction.

The term "effective reproducing area" used herein should be understood as an area which is created by the magnetic recording medium in the reproducing head, the area having a stronger reproducing magnetic field than the lower limit of magnetic field strength that is detectable by the reproducing head so that the reproducing head can detect the reproducing magnetic field.

The term "reproducing offtrack" used herein should be understood as an amount of offtrack error in the track width direction between the center of the effective reproducing area in the reproducing head and the center of the reproducing target track in the track width direction.

According to the present invention, since the tracks are formed by convex portions and since the effective recording width is equal to or more than the track width, the track is magnetized and magnetic data is recorded or deleted entirely to the edges in the track width direction. Moreover, by forming the tracks by the convex portions, problems such as side writing near track edges (in the track width direction) are less likely to occur than with tracks that are formed on a continuous recording layer only by application of heat or magnetic field.

Since the effective recording width is limited to be equal to or less than the sum of the track width and the doubled value of width of the concave portion, erroneous recording of magnetic data onto adjacent tracks is prevented.

The effective recording width is feasible to achieve even with a fine track width, since it is equal to or more than the track width and equal to or less than the sum of the track width and the doubled value of width of the concave portion, and the permissible range of variations in the temperature of heated portion of the track and recording magnetic field is accordingly wide.

That is, the invention enables reliable recording and reproducing of magnetic data in a very small area, which leads to increased areal density and improved recording and reproducing precision.

Since the tracks are formed by convex portions, the problems of side fringe and cross-talk are suppressed, which also lead to increased areal density.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

As shown in FIG. 1 to FIG. 4, a magnetic recording and reproducing device 10 according to a first exemplary embodiment of the present invention includes a magnetic recording medium 16 having a magnetic recording layer 12 formed in a concavo-convex pattern so that tracks 14 for recording magnetic data are formed by convex portions of a predetermined track width Tw and arranged in parallel with a predetermined track pitch Tp in the track width Tw direction, a heating head 18 for heating the magnetic recording medium 16 to partially reduce the coercivity of the tracks 14, a recording head 20 for applying a recording magnetic field to a heated portion of the magnetic recording medium 16, and a reproducing head 21 for detecting a reproducing magnetic field on the tracks 14. An effective recording area A3 created on the magnetic recording medium 16 by the heating head 18 and the recording head 20 has an effective recording width Erw that is equal to or more than the track width Tw, and equal to or less than a sum (Tw+2 Gw) of the track width Tw and a doubled value of the width Gw of concave portions between the tracks. Other features of the magnetic recording and reproducing device are not essential for the understanding of this exemplary embodiment, therefore the description thereof will be omitted.

Figure 1:
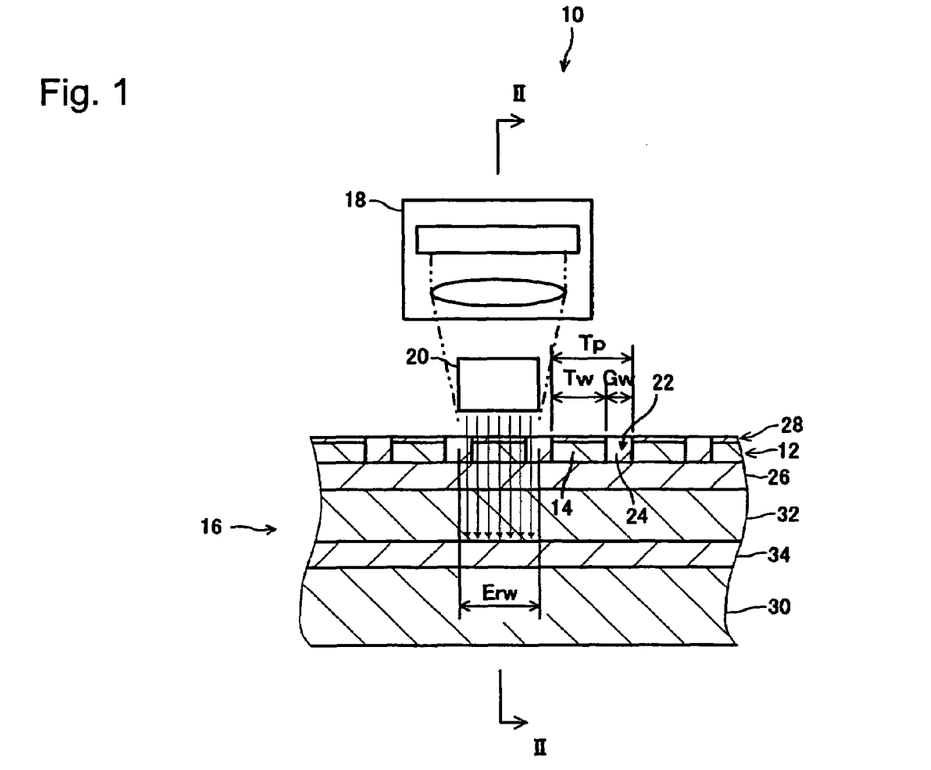
FIG. 1 is a schematic cross-sectional side view schematically showing the structure of a magnetic recording and reproducing device according to a first exemplary embodiment of the present invention.

The magnetic recording medium 16 is a substantially disc-like, perpendicular recording type discrete track medium, having a magnetic recording layer 12 in which concentric tracks 14 are formed with fine pitch in the radial direction in a data area and convex recording elements (not shown) of a predetermined servo information pattern are formed in a servo area. The magnetic recording layer 12 is made of a CoCrPt (cobalt-chromium-platinum) alloy.

Concave portions 22 between the tracks 14 are filled with a non-magnetic material 24 that has a lower heat conductivity than the magnetic recording layer 12. Specific examples of the chief component of the non-magnetic material 24 include $SiO_2$ (silicon dioxide), Ti (titanium), $Al_2O_3$ (aluminum oxide), MgO (magnesium oxide), $TiO_2$ (titanium dioxide), and $ZrO_2$ (zirconium oxide).

Upon the tracks 14 of the magnetic recording layer 12 is formed a heat conduction layer 28 having a higher heat conductivity than the magnetic recording layer 12. The heat conduction layer 28 is made of, for example, Al (aluminum) and divided similarly to the tracks 14 and filled with the non-magnetic material 24 in the gaps. A protection layer and a lubricating layer are actually formed over the heat conduction layer 28 and the non-magnetic material 24, but the illustration and description of these layers will be omitted as they are not essential for the understanding of this exemplary embodiment.

Also, between the magnetic recording layer 12 and the glass substrate 30 are formed a seed layer 26, a soft magnetic layer 32, and an underlayer 34, but the description thereof will be omitted as they are not essential for the understanding of the present invention.

The heating head 18 includes a laser light source 18A and an objective lens 18B and is disposed in close proximity above the magnetic recording medium 16 so that laser light is projected to heat the magnetic recording medium 16.

Figure 2:
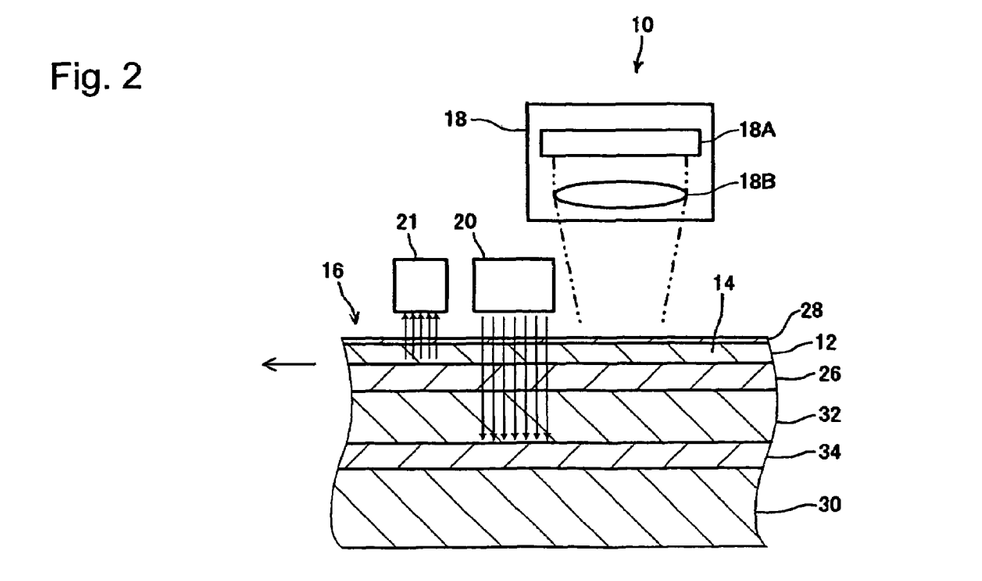
FIG. 2 is a cross-sectional side view taken along the line II-II of FIG. 1.

The recording head 20 is also disposed in close proximity above the magnetic recording medium 16, near the heating head 18 on the side to which the magnetic recording medium 16 is fed (direction indicated by an arrow in FIG. 2). The recording head 20 is constructed to apply a recording magnetic field to the tracks 14 in a direction perpendicular to the surface of the magnetic recording medium 16.

The reproducing head 21 is also disposed in close proximity above the magnetic recording medium 16, near the recording head 20 on the side to which the magnetic recording medium 16 is fed (direction indicated by the arrow in FIG. 2).

Figure 4:
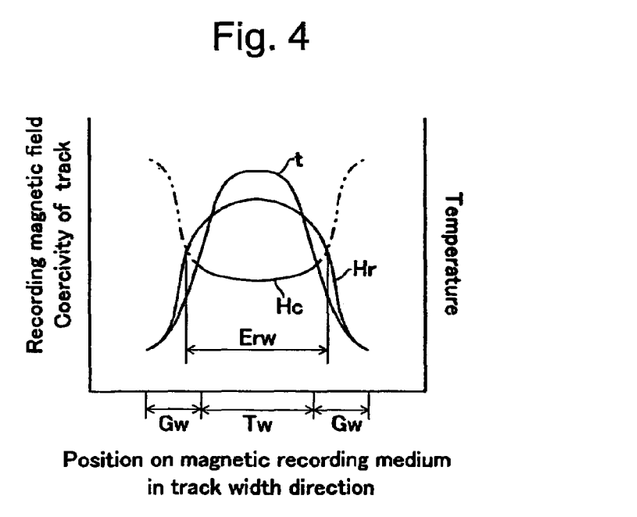
FIG. 4 is a graph schematically showing the distributions of recording magnetic field, coercivity, and temperature in the magnetic recording medium.

An effective recording area A3 is, more specifically, an area created upon the magnetic recording medium 16 by the heating head 18 and the recording head 20, assuming that the magnetic recording layer 12 is entirely evenly formed (with the concave portions 22 regarded as being filled with the magnetic recording layer 12), as shown in FIG. 4, which area has a stronger recording magnetic field Hr than the coercivity Hc of the magnetic recording layer 12 so that magnetic data can be recorded and deleted.

The effective recording width Erw is the width of the effective recording area A3 in the direction of track width Tw. Of the curved line indicating the coercivity Hc of the track in FIG. 4, the two dot chain part shows the distribution of coercivity when it is assumed that the magnetic recording layer 12 is entirely evenly formed.

Figure 5:
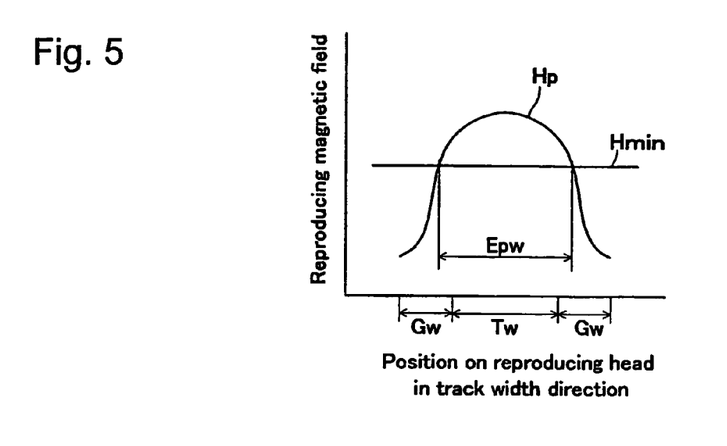
FIG. 5 is a graph schematically showing the distribution of reproducing magnetic field in the magnetic recording medium.

The effective reproducing width Epw of the reproducing head 21 is also limited to a range of from the track width Tw to the sum (Tw+2Gw) of the track width Tw and the doubled value of the width Gw of the concave portion. The effective reproducing width Epw, as shown in FIG. 5, is the width in the track width Tw direction of an area created in the reproducing head 21 by the magnetic recording medium 16, which area has a stronger reproducing magnetic field Hp than the lower limit of magnetic field strength (Hmin) detectable by the reproducing head 21 so that the reproducing head 21 can detect the reproducing magnetic field Hp.

Next, the effects that the magnetic recording and reproducing device 10 produces will be described.

Figure 3:
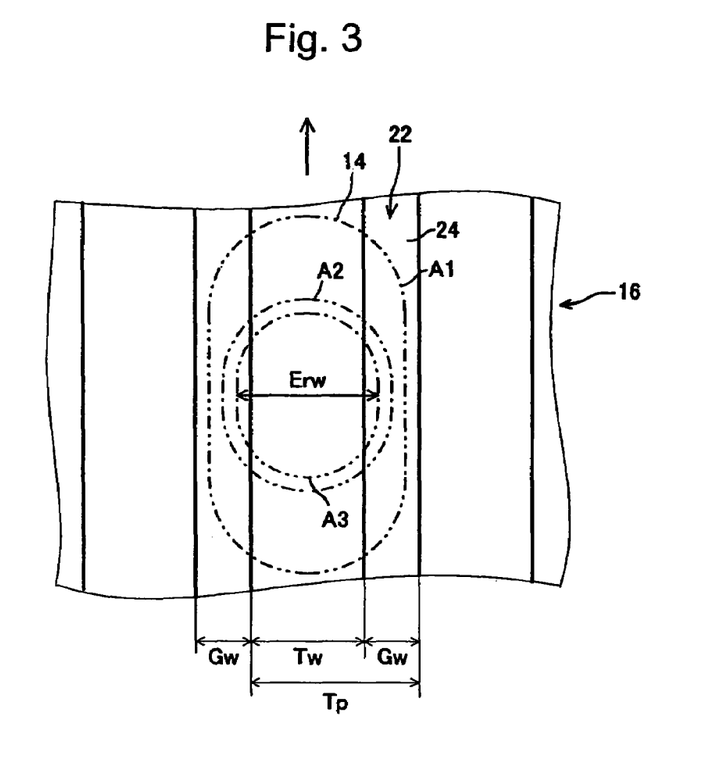
FIG. 3 is an enlarged cross-sectional plan view showing the surface of a magnetic recording layer of a magnetic recording medium in the magnetic recording and reproducing device.

First, the effects achieved when recording magnetic data will be described. When the heating head 18 projects laser light onto a recording target portion of the track 14 as the magnetic recording medium 16 is driven in the direction of the arrow in FIG. 2, the area A1 in the magnetic recording medium 16 as shown in FIG. 3 is heated to a higher temperature to have a temperature distribution indicated by t shown in FIG. 4. This reduces the coercivity of the track 14 in the area A1, resulting in the coercivity distribution indicated by Hc in FIG. 4. The heat conduction layer 28 formed on the track 14 promotes heat conduction and enables efficient heating. On the other hand, since the non-magnetic material 24 filled in the concave portions 22 between the tracks 14 and between the heat conduction layers 28 has a lower heat conductivity than the magnetic recording layer 12, heat conduction from the recording target track 14 to adjacent tracks 14 is suppressed.

When the recording head 20 applies a recording magnetic field to the heated portion of the track 14, the recording magnetic field is applied to an area A2 of the magnetic recording medium 16 shown in FIG. 3, and has a distribution indicated by Hr in FIG. 4 within the area A2. Magnetic data can be recorded in an effective recording area A3 that has a stronger recording magnetic field Hr applied by the recording head 20 than the coercivity Hc of the track 14. In fact, since the effective recording width Erw of the effective recording area A3 is equal to or more than the track width Tw, the track 14 is magnetized or its magnetic polarity is reversed to the edges of the track width Tw direction, thereby magnetic data is recorded.

Since the effective recording width Erw is equal to or less than the sum (Tw+2Gw) of the track width Tw and the doubled value of the concavity width Gw, erroneous recording of magnetic data onto other tracks 14 adjacent to the recording target track 14 does not occur.

Next, the effects achieved when reproducing magnetic data will be described. The reproducing head 21 detects a reproducing magnetic field from the track 14 as the magnetic recording medium 16 is driven in the direction of the arrow in FIG. 2. More specifically, the reproducing head 21 receives magnetic data in an effective reproducing area where the reproducing magnetic field Hp is higher than the lower limit Hmin of detectable reproducing magnetic field. Since the effective reproducing width Epw of the effective reproducing area is equal to or more than the track width Tw, the reproducing magnetic field Hp representing magnetic data recorded to the edges in the track width Tw direction on the track 14 is completely received, with good sensitivity. Moreover, since the effective reproducing width Epw is equal to or less than the sum (Tw+2Gw) of the track width Tw and the doubled value of the width Gw of the concave portion, erroneous reception of a reproducing magnetic field of the magnetic data recorded on other tracks 14 adjacent to the target track 14 does not occur.

That is, the magnetic recording and reproducing device 10 is capable of recording magnetic data precisely on a target portion of the track 14 and precisely reproducing the magnetic data. In other words, the device is capable of reliably recording and reproducing magnetic data even though the target area for recording magnetic data is minute, thus achieving both a high areal density and good recording and reproducing precision.

The effective recording width Erw is feasible to achieve even with the fine track width Tw, since it is in the range of from the track width Tw to the sum Tw+2G of the track width Tw and the doubled value of the width Gw of the concave portion, and the permissible range of variations in the temperature of heated portion of the track 14 and recording magnetic field is accordingly wide.

Moreover, since the tracks 14 are formed by convex portions and divided from each other, the problems of recording onto other tracks 14 adjacent to a recording target track 14 and cross-talk are suppressed, which also lead to increased areal density.

Figure 6:
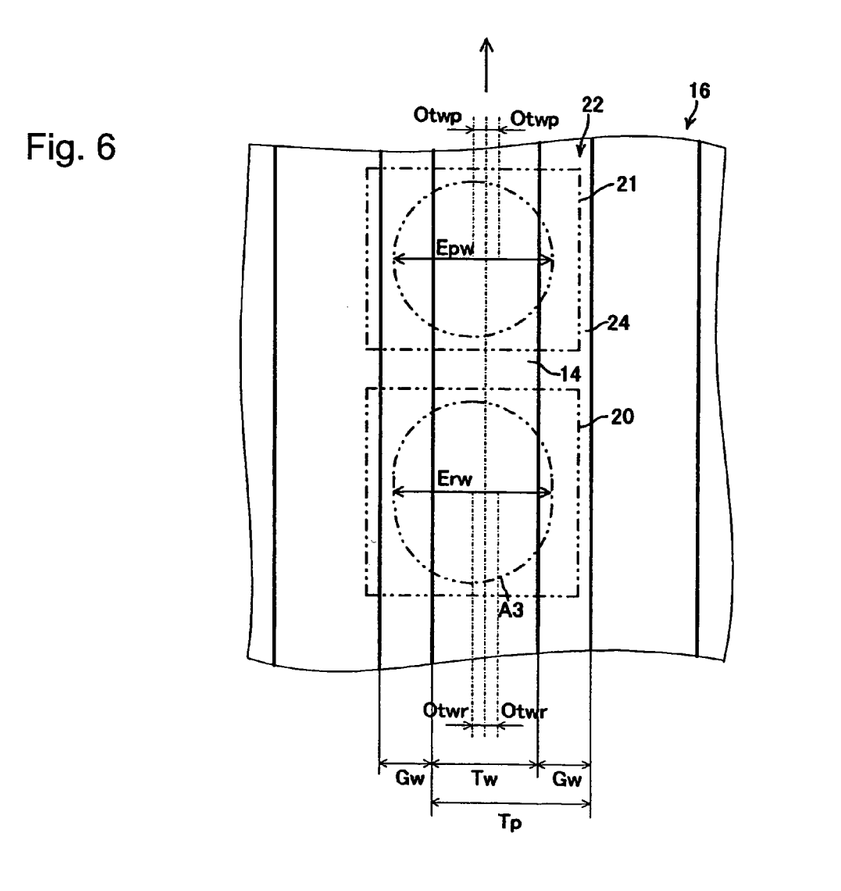
FIG. 6 is a cross-sectional plan view showing a recording offtrack and a reproducing offtrack in the magnetic recording and reproducing device.

The effective recording width Erw is limited in the range of from the track width Tw to the sum (Tw+2Gw) of the track width Tw and the doubled value of the width Gw of concave portions between the tracks 14 in the first exemplary embodiment. When, however, there is a recording offtrack Otwr between the effective recording area A3 and the track 14 as shown in FIG. 6, the effective recording width Erw may be set in the range of from a sum (2Otwr+Tw) of a doubled value of recording offtrack Otwr and the track width Tw to a value (Tw+2Gw−2Otwr) obtained by subtracting the doubled value of the recording offtrack Otwr from the sum of the track width Tw and the doubled value of the width Gw of the concave portion. The "recording offtrack" is an amount of offtrack error between the center of the effective recording area A3 and the center of the recording target track 14 in the track width direction. Thereby, reliable recording of magnetic data is achieved even when there is an offtrack Otwr in the track width Tw direction between the heating head 18 and the recording target track 14, and/or between the recording head 20 and the recording target track 14.

Similarly, when there is a reproducing offtrack Otwp between the effective reproducing area in the reproducing head 21 and the track 14 as shown in FIG. 6, the effective reproducing width Epw may be set in the range of from (Tw+2Otwp) to (Tw+2Gw−2Otwp). The "reproducing offtrack" is an amount of offtrack error in the track width direction between the center of the effective reproducing area in the reproducing head 21 and the center of the reproducing target track 14 in the track width direction. Thereby, reliable reproducing of magnetic data is achieved even when there is an offtrack Otwp in the track width Tw direction between the reproducing head 21 and the reproducing target track 14.

Figure 7:
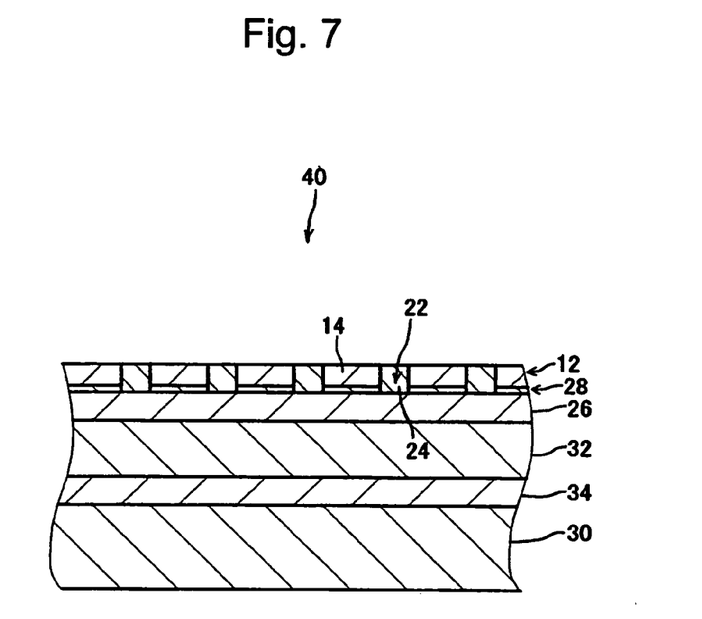
FIG. 7 is a cross-sectional side view showing another example of a magnetic recording medium in the magnetic recording and reproducing device.
Figure 8:
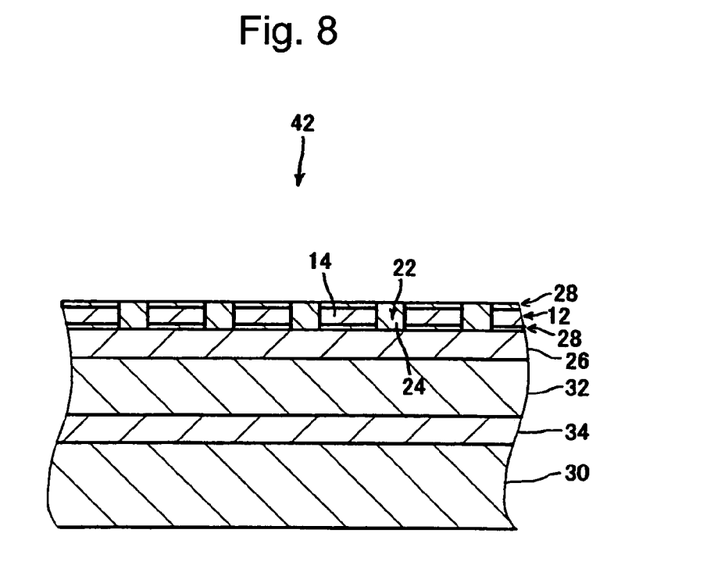
FIG. 8 is a cross-sectional side view showing yet another example of a magnetic recording medium in the magnetic recording and reproducing device.

While the heat conduction layer 28 is formed on the upper side of the track 14 in the first exemplary embodiment, as with a magnetic recording medium 40 shown in FIG. 7, a heat conduction layer 28 formed on the lower side of the track 14 will provide the effect of reducing variations in the temperature distribution of the heated portion. As with a magnetic recording medium 42 shown in FIG. 8, if the heat conduction layer 28 is formed on both sides of the track 14, variations in the temperature distribution of the heated portion will be further reduced. On the other hand, if there are only small variations in the temperature distribution of the portion heated by the heating head 18, the heat conduction layer may be omitted.

While $SiO_2$, Ti, $Al_2O_3$, MgO $TiO_2$, and $ZrO_2$ are shown as examples of the main component of the non-magnetic material 24 in the first exemplary embodiment, this is not a requirement and any other material can be used as long as it is non-magnetic and has a lower heat conductivity than the magnetic recording layer 12.

Figure 9:
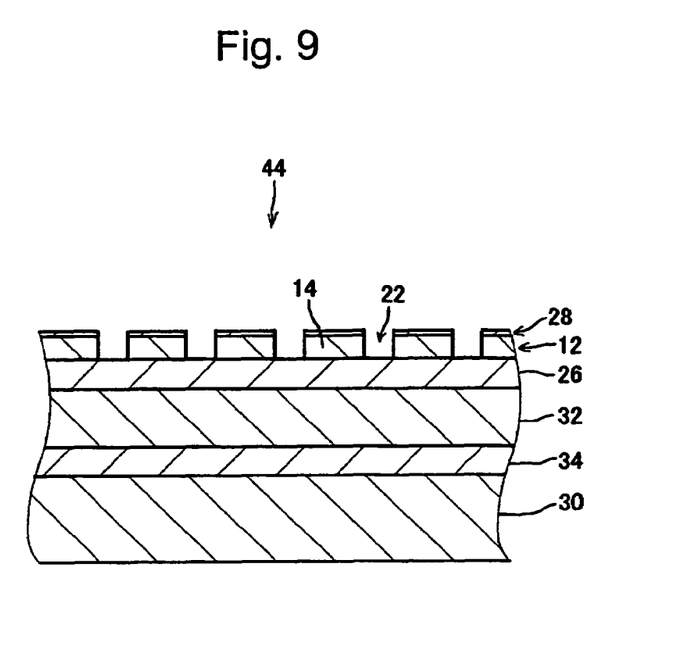
FIG. 9 is a cross-sectional side view showing a further example of a magnetic recording medium in the magnetic recording and reproducing device.

The concave portions 22 are filled with the non-magnetic material 24 in the first exemplary embodiment to flatten the surface and to stabilize the head flying height while suppressing heat conduction to the tracks adjacent to a recording target track. The concave portions 22 may be left as gaps as with a magnetic recording medium 44 shown in FIG. 9, if a sufficiently stable head flying height is achieved without filling the concave portions 22 with the non-magnetic material 24. Thereby, heat conduction from the recording target track to adjacent tracks is further suppressed.

Figure 10:
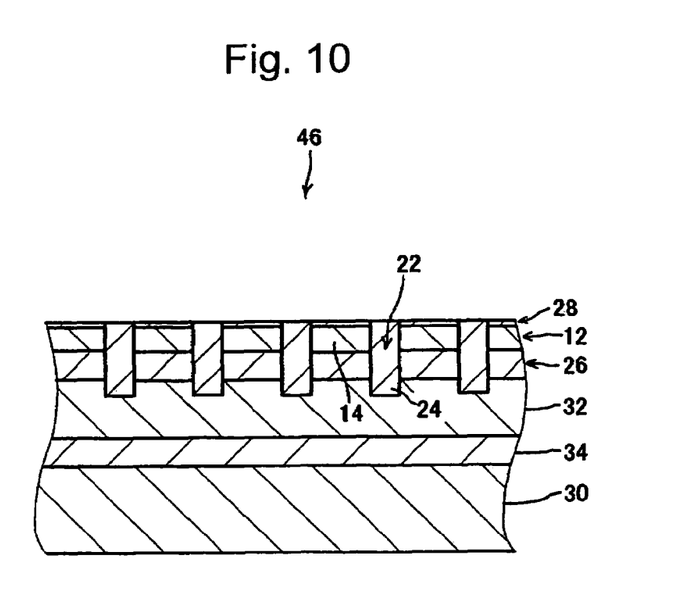
FIG. 10 is a cross-sectional side view showing another example of a magnetic recording medium in the magnetic recording and reproducing device.

While the concave portions 22 are formed up to the lower face of the magnetic recording layer 12 in the magnetic recording medium 16 of the first exemplary embodiment, the concave portions 22 may be formed deeper into the layer(s) under the magnetic recording layer 12, more specifically the seed layer 26 and part of the soft magnetic layer 32, for example as with a magnetic recording medium 46 shown in FIG. 10, and then filled with a non-magnetic material 24 that has a lower heat conductivity than the magnetic recording layer, so as to further enhance the heat insulation effect. If a sufficiently stable head flying height is achieved, the concave portions 22 maybe formed into the layer under the magnetic recording layer 12 and left as gaps, whereby the heat insulation effect is further increased.

While the heating head 18 heats the magnetic recording medium 16 partially by projecting laser light in the first exemplary embodiment, heating heads that use other techniques such as electron beam radiation may be employed as long as they are capable of partially heating the magnetic recording medium 16.

While a seed layer 26, a soft magnetic layer 32, and an underlayer 34 are formed under the magnetic recording layer 12 in the first exemplary embodiment, the structure under the magnetic recording layer 12 may be variously designed in accordance with the type of the magnetic recording and reproducing device. For example, one or two of the underlayer 34, the soft magnetic layer 32, and the seed layer 26 may be omitted. Alternatively, each layer may be formed by multiple layers. Or, the magnetic recording layer 12 may be formed directly on the glass substrate 30.

While the magnetic recording medium 16 of the first exemplary embodiment is a one-sided disc having its magnetic recording layer 12 formed on one side of the glass substrate 30, the present invention is applicable also to dual-sided magnetic recording media having magnetic recording layers on both sides of the glass substrate. In this case, the heating head, the recording head, and the reproducing head are disposed on both sides of the magnetic recording medium.

While the magnetic recording medium 16 of the first exemplary embodiment is a perpendicular recording medium, the present invention is applicable also to longitudinal magnetic recording media. In this case, the soft magnetic layer need not be formed under the magnetic recording layer.

Figure 11:
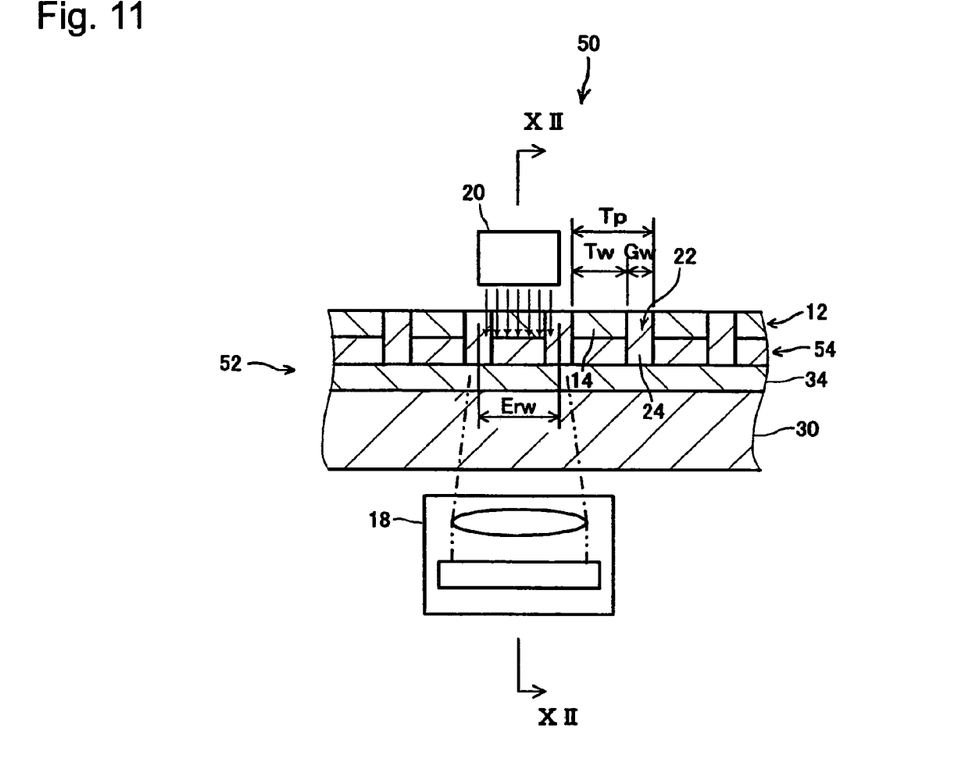
FIG. 11 is a schematic cross-sectional side view schematically showing the structure of a magnetic recording and reproducing device according to a second exemplary embodiment of the present invention.
Figure 12:
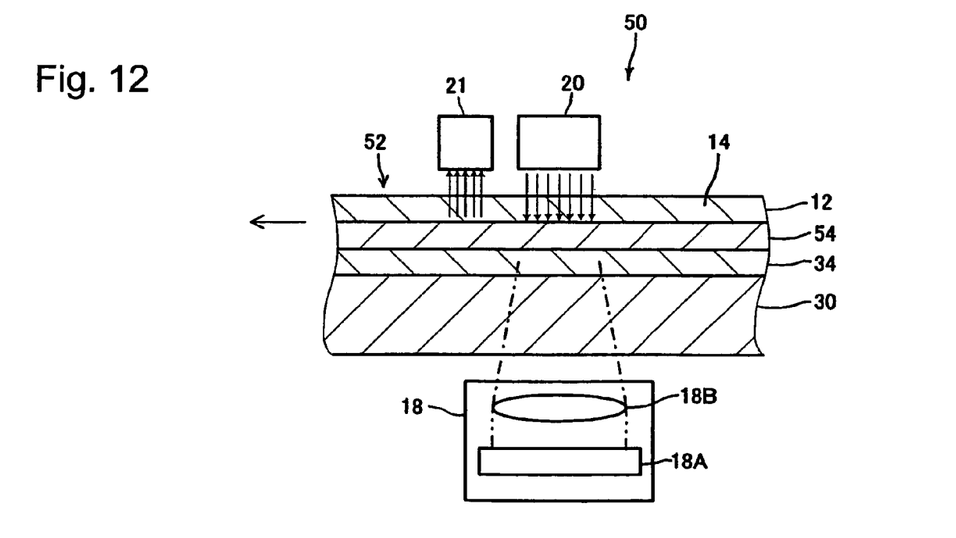
FIG. 12 is a cross-sectional side view taken along the line XII-XII of FIG. 11.

Next, a second exemplary embodiment of the present invention will be described. As shown in FIG. 11 and FIG. 12, in the magnetic recording and reproducing device 50 of the second exemplary embodiment, a recording head 20 and a reproducing head 21 are disposed on one side of a magnetic recording medium 52, while a heating head 18 is disposed on the other side so as to heat the magnetic recording layer 12 through the glass substrate 30 by projecting laser light. The magnetic recording medium 52 does not have a soft magnetic layer formed under the magnetic recording layer 12. No heat conduction layer is formed on the upper side of the tracks 14, but a heat conduction layer 54 that is made of a material having a higher heat conductivity than the tracks 14 and also functions as a seed layer is formed under the tracks 14 such that it is divided similarly to the tracks 14. As other elements are the same as those of the magnetic recording and reproducing device 10 of the first exemplary embodiment described above, they are given the same reference numerals of FIG. 1 to FIG. 5 and the description thereof will be omitted.

The recording head 20 and the heating head 18 are disposed such that laser light is projected to a recording target portion of the magnetic recording medium 52 at the same time when a recording magnetic field is applied to the same portion. Thereby, magnetic data recording precision can be further improved. As with the magnetic recording and reproducing device 10 of the first exemplary embodiment described above, the recording head 20 and the heating head 18 may be disposed such that the laser radiation portion does not completely match the recording magnetic field application portion, as long as sufficient recording precision is achieved.

While the substrate 30 of the magnetic recording medium 52 is made of glass in the second exemplary embodiment, the substrate may be made of other material as long as it is non-magnetic and transparent or translucent.

While the heat conduction layer 54 is formed under the tracks 14 in the second exemplary embodiment, the heat conduction layer may be formed on the upper side of the tracks 14. Alternatively, heat conduction layers may be formed on both sides of the tracks 14 so as to further suppress variations in the heat distribution of the heated portion.

While the magnetic recording layer 12 is made of a CoCrPt alloy in the first and second exemplary embodiments described above, any other material may be used. For example, the present invention is also applicable to a magnetic recording medium having recording elements that are composed of other alloys containing a iron group element (Co, Fe, and Ni) or other material such as a laminated piece of these alloys, particularly high magnetic anisotropy materials such as CoPt, FePt and other ordered alloys, and multi-layered films of Co/Pd or Co/Pt.

While the magnetic recording medium 16, 40, 42, 44, 46, or 52 of the above-described first or second exemplary embodiment are discrete track media wherein tracks 14 are formed parallelly in the radial direction in the data area, the present invention is obviously applicable to a magnetic recording and reproducing device having a patterned medium wherein tracks are formed parallelly with a fine pitch in both radial and circumferential directions, a PERM (pre-embossed recording medium) wherein the magnetic recording layer is continuous also in the concave portions of the concavo-convex pattern, and a magnetic recording medium having spiral tracks.

The present invention is applicable to a magnetic recording and reproducing device which records magnetic data by application of heat and magnetic field and which magnetically reproduces the magnetic data.

What is claimed is:

1. A magnetic recording and reproducing device comprising:
    a magnetic recording medium in which a magnetic recording layer is formed in a concavo-convex pattern so that a plurality of tracks for recording magnetic data are formed by convex portions of a predetermined track width and arranged in parallel with a predetermined track pitch in a track width direction;
    a heating head for heating the magnetic recording medium to partially reduce coercively of the tracks;
    a recording head for applying a recording magnetic field to a heated portion of the magnetic recording medium; and
    a reproducing head for detecting a reproducing magnetic field of the tracks, wherein
    an effective recording area created by the heating head and the recording head on the magnetic recording medium has an effective recording width in the track width direction that is equal to or more than a sum of the track width and a doubled value of recording offtrack between the effective recording area and one of the tracks, and equal to or less than a value obtained by subtracting the doubled value of the recording offtrack from the sum of the track width and the doubled value of width of the concave portions.

2. The magnetic recording and reproducing device according to claim 1, wherein
    the magnetic recording medium has a substrate on one side of the magnetic recording layer, and
    the heating head is disposed on another side of the magnetic recording layer.

3. The magnetic recording and reproducing device according to claim 1, wherein
    the magnetic recording layer is formed only at the convex portions of the concavo-convex pattern and is not formed at concave portions of the concavo-convex pattern.

4. A magnetic recording and reproducing device comprising:
    a magnetic recording medium in which a magnetic recording layer is formed in a concavo-convex pattern so that a plurality of tracks for recording magnetic data are formed by convex portions of a predetermined track width and arranged in parallel with a predetermined track pitch in a track width direction;
    a heating head for heating the magnetic recording medium to partially reduce coercively of the tracks;
    a recording head for applying a recording magnetic field to a heated portion of the magnetic recording medium; and
    a reproducing head for detecting a reproducing magnetic field of the tracks, wherein
    an effective recording area created by the heating head and the recording head on the magnetic recording medium has an effective recording width in the track width direction that is equal to or more than the track width, and equal to or less than a sum of the track width and a doubled value of width of concave portions between the tracks,
    an effective reproducing area created in the reproducing head by the magnetic recording medium has an effective reproducing width in the track width direction that is equal to or more than a sum of the track width and a doubled value of a reproducing offtrack between the effective reproducing area and one of the tracks, and equal to or less than a value obtained by subtracting the doubled value of the reproducing offtrack from the sum of the track width and the doubled value of width of the concave portions.

5. The magnetic recording and reproducing device according to claim 4, wherein
    the magnetic recording medium has a substrate on one side of the magnetic recording layer, and
    the heating head is disposed on another side of the magnetic recording layer.

6. The magnetic recording and reproducing device according to claim 4, wherein
    the magnetic recording layer is formed only at the convex portions of the concavo-convex pattern and is not formed at concave portions of the concavo-convex pattern.

* * * * *